United States Patent
Anderson et al.

(10) Patent No.: US 12,169,780 B2
(45) Date of Patent: *Dec. 17, 2024

(54) MISUSE INDEX FOR EXPLAINABLE ARTIFICIAL INTELLIGENCE IN COMPUTING ENVIRONMENTS

(71) Applicant: Intel Corporation, Santa Clara, CA (US)

(72) Inventors: Glen J. Anderson, Beaverton, OR (US); Rajesh Poornachandran, Portland, OR (US); Kshitij Doshi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,843

(22) Filed: May 25, 2023

(65) Prior Publication Data

US 2023/0385640 A1 Nov. 30, 2023

Related U.S. Application Data

(63) Continuation of application No. 16/287,313, filed on Feb. 27, 2019, now Pat. No. 11,710,034.

(51) Int. Cl.
| | |
|---|---|
| *G06F 7/00* | (2006.01) |
| *G06F 16/901* | (2019.01) |
| *G06F 16/906* | (2019.01) |
| *G06F 18/21* | (2023.01) |
| *G06F 18/214* | (2023.01) |

(Continued)

(52) U.S. Cl.
CPC ............. *G06N 3/08* (2013.01); *G06F 16/901* (2019.01); *G06F 16/906* (2019.01); *G06F 18/2148* (2023.01); *G06F 18/217* (2023.01); *G06F 18/41* (2023.01); *G06N 5/04* (2013.01); *G06N 20/00* (2019.01); *G06V 10/776* (2022.01); *G06V 10/7788* (2022.01)

(58) Field of Classification Search
CPC .. G06F 16/901; G06F 16/906; G06F 18/2148; G06F 18/217; G06F 18/41; G06F 18/241; G06N 5/04; G06N 20/00; G06N 3/045; G06V 10/776; G06V 10/7788

See application file for complete search history.

(56) References Cited

U.S. PATENT DOCUMENTS

| | | | |
|---|---|---|---|
| 5,465,321 A * | 11/1995 | Smyth ................ | G06F 11/2257 706/20 |
| 7,424,619 B1 * | 9/2008 | Fan ....................... | G06F 21/552 713/188 |

(Continued)

*Primary Examiner* — Mohammed R Uddin
(74) *Attorney, Agent, or Firm* — Akona IP PC

(57) ABSTRACT

A mechanism is described for facilitating misuse index for explainable artificial intelligence in computing environments, according to one embodiment. A method of embodiments, as described herein, includes mapping training data with inference uses in a machine learning environment, where the training data is used for training a machine learning model. The method may further include detecting, based on one or more policy/parameter thresholds, one or more discrepancies between the training data and the inference uses, classifying the one or more discrepancies as one or more misuses, and creating a misuse index listing the one or more misuses.

20 Claims, 9 Drawing Sheets

(51) Int. Cl.
*G06F 18/40* (2023.01)
*G06N 3/08* (2023.01)
*G06N 5/04* (2023.01)
*G06N 20/00* (2019.01)
*G06V 10/776* (2022.01)
*G06V 10/778* (2022.01)

(56) References Cited

U.S. PATENT DOCUMENTS

| | | | | |
|---|---|---|---|---|
| 8,866,936 | B2* | 10/2014 | Barbu | H04N 5/21 |
| | | | | 348/241 |
| 10,158,653 | B1* | 12/2018 | Magcale | H04L 63/1441 |
| 10,284,604 | B2* | 5/2019 | Barday | H04L 63/04 |
| 10,380,413 | B2* | 8/2019 | Ye | G06T 7/75 |
| 10,460,235 | B1* | 10/2019 | Truong | G06F 16/24568 |
| 10,552,764 | B1* | 2/2020 | Carlin | G06N 20/00 |
| 10,628,834 | B1* | 4/2020 | Agarwal | G16H 10/60 |
| 11,585,896 | B2* | 2/2023 | Harrison | G06N 3/045 |
| 2007/0104374 | A1* | 5/2007 | Terakawa | G06V 10/50 |
| | | | | 382/190 |
| 2008/0154704 | A1* | 6/2008 | Flake | G06Q 30/0201 |
| | | | | 705/7.29 |
| 2014/0279757 | A1* | 9/2014 | Shimanovsky | G06F 16/2477 |
| | | | | 706/12 |
| 2016/0180200 | A1* | 6/2016 | Vijayanarasimhan | G06N 3/04 |
| | | | | 706/20 |
| 2017/0293480 | A1* | 10/2017 | Wexler | G06F 8/65 |
| 2018/0018508 | A1* | 1/2018 | Tusch | G06V 20/52 |
| 2018/0232679 | A1* | 8/2018 | Hamilton | G06Q 10/06398 |
| 2018/0268015 | A1* | 9/2018 | Sugaberry | G06F 16/24575 |
| 2018/0374245 | A1* | 12/2018 | Xu | A61B 6/563 |
| 2019/0043201 | A1* | 2/2019 | Strong | G06V 10/96 |
| 2019/0087691 | A1* | 3/2019 | Jelveh | G06N 3/084 |
| 2019/0102700 | A1* | 4/2019 | Babu | G06N 20/00 |
| 2019/0163965 | A1* | 5/2019 | Yoo | G06V 40/176 |
| 2019/0205606 | A1* | 7/2019 | Zhou | G06F 18/285 |
| 2019/0253615 | A1* | 8/2019 | Fukuya | G10L 15/22 |
| 2019/0260787 | A1* | 8/2019 | Zou | G06N 3/08 |
| 2019/0370602 | A1* | 12/2019 | Haneda | G06N 3/08 |
| 2020/0242154 | A1* | 7/2020 | Haneda | G06F 16/535 |
| 2020/0302318 | A1* | 9/2020 | Hetherington | G06N 20/20 |
| 2020/0327378 | A1* | 10/2020 | Smith | G06N 5/048 |
| 2022/0147395 | A1* | 5/2022 | Guim Bernat | G06N 3/04 |
| 2022/0147970 | A1* | 5/2022 | Babcock | G06Q 20/4016 |
| 2022/0148169 | A1* | 5/2022 | Mermel | G06T 7/0012 |
| 2022/0149903 | A1* | 5/2022 | Lee | H04B 7/0456 |
| 2022/0286482 | A1* | 9/2022 | Barday | H04L 51/18 |

* cited by examiner

MISUSE INDEX FOR EXPLAINABLE ARTIFICIAL INTELLIGENCE IN COMPUTING ENVIRONMENTS

RELATED APPLICATION

This application is a continuation of and claims the benefit of priority from U.S. patent application Ser. No. 16/287,313, filed on Feb. 27, 2019, issued as U.S. Pat. No. 11,710,034 on Jul. 25, 2023, the full disclosure of which is incorporated herein by reference in its entirety.

FIELD

Embodiments described herein relate generally to data processing and more particularly to facilitate misuse index for explainable artificial intelligence in computing environments.

BACKGROUND

With the rapid growth of artificial intelligence (AI), newer and increasingly better applications are being offered to allow for greater and easier phases of learning, deciding, and acting as perceived by users. Such newer applications are offered based on Explainable AI (XAI), which provides for explainable models and interfaces for easier interaction and learning with users.

However, as AI and XAI are being used in more circumstances than ever, with greater number of classifiers based on machine learning (ML), such as using deep neural networks (DNNs), there is a greater-than-ever potential for misuse of ML/deep learning (DL) models, and even a perception of which could lead to associating negative connotation with AI/XAI. For example, there have been concerns regarding certain face recognition techniques, such as legal and ethical apprehensions relating to inappropriate use and generalization of face recognition models.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for delivery of AI or XAI models, such as machine learning models, and other pertinent tools that allow for an indication of whether a model is being used appropriately (e.g., legally, ethically, etc.) by establishing a misuse index based on model training and use. In one embodiment, any inconsistencies between training data and inference data associated with a model are detected and such information may then be documented and reported through a misuse index such that any inappropriate use of the model may be stopped and subsequently, prevented for future uses.

As will be further described in this document, appropriate uses of XAI models, such as ML models, may be those that are in compliance with any governmental laws, ordinances and/or decrees, institutional rules and/or regulations, societal or community standards, expectations, and/or ethics, personal values, morals, and/or ideals, etc. In some embodiments, what is regarded as appropriate (or inappropriate) may be dynamic based on any number and type of factors, such as societal values or expectations, etc., and once a minimum level for what are appropriate/inappropriate uses is established, a misuse index may then be generated based on that minimum level to ensure that XAI models comply with at least the minimum and, in turn, function within the prescribed bounds of any pertinent laws, rules, ethics, expectations, and/or the like.

It is to be noted that terms like "XAI model", "AI model", "machine learning model", "ML model", "deep learning model", "DL model", "neural network (NN) model", "NN model", "model", and/or the like, are interchangeably referenced throughout this document. Further, terms like "autonomous machine" or simply "machine", "autonomous vehicle" or simply "vehicle", "autonomous agent" or simply "agent", "autonomous device" or simply "device", as well as "computing device", "robot", and/or the like, may be interchangeably referenced throughout this document.

Figure 1:
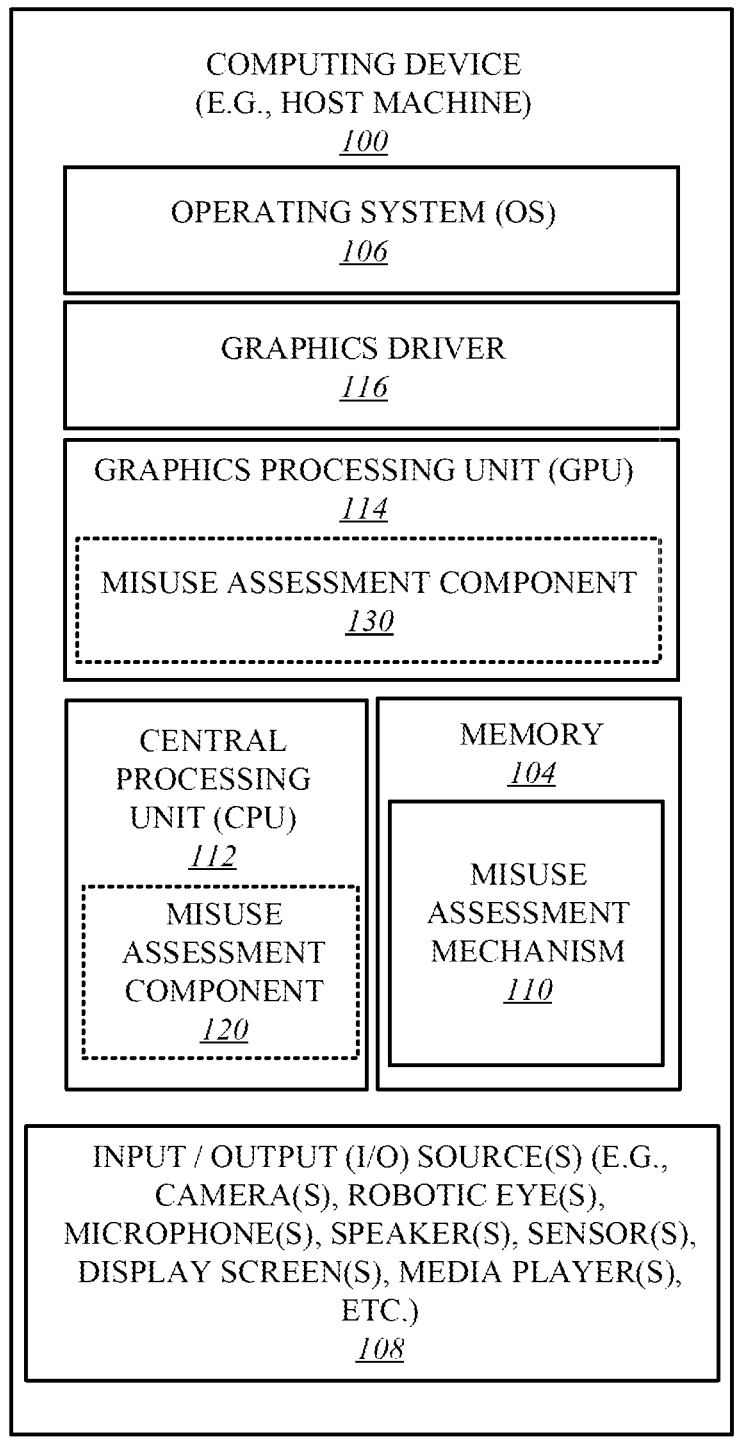
FIG. 1 illustrates a computing device employing a misuse assessment mechanism according to one embodiment.

FIG. 1 illustrates a computing device 100 employing a misuse assessment mechanism 110 according to one embodiment. Computing device 100 represents a communication and data processing device including or representing (without limitation) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted displays (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limited to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 104, network devices, drivers, and/or the like, as well as input/output (I/O) source(s) 108, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be preferred for certain implementations. Therefore, any configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). Terms like "logic", "module", "component", "engine", "circuitry", "element", and "mechanism" may include, by way of example, software, hardware, firmware, and/or a combination thereof.

In one embodiment, as illustrated, misuse assessment mechanism 110 may be hosted by memory 104 in communication with I/O source(s) 108, such as microphones, speakers, etc., of computing device 100. In another embodiment, misuse assessment mechanism 110 may be part of or hosted by operating system 106. In yet another embodiment, misuse assessment mechanism 110 may be hosted or facilitated by graphics driver 116. In yet another embodiment, misuse assessment mechanism 110 may be hosted by or part of graphics processing unit ("GPU" or simply graphics processor") 114 or firmware of graphics processor 114; for example, misuse assessment mechanism 110 may be embedded in or implemented as part of the processing hardware of graphics processor 114 in the form of misuse assessment component 130. Similarly, in yet another embodiment, misuse assessment mechanism 110 may be hosted by or part of central processing unit ("CPU" or simply "application processor") 112; for example, misuse assessment mechanism 110 may be embedded in or implemented as part of the processing hardware of application processor 112 in the form of misuse assessment component 120.

For example, misuse assessment components 120, 130 and/or any elements of misuse assessment mechanism 110 may be implemented by one or more analog or digital circuits, logic circuits, programmable processors, programmable controllers, GPUs, digital signal processors (DSPs), application specific integrated circuits (ASICs), programmable logic devices (PLDs), and/or field programmable logic devices (FPLDs).

It is contemplated that this novel technique is not limited to a software implementation or a hardware implementation and, as will be further described in this document, this novel technique may be applied and implemented in software, hardware, firmware, or any combination thereof. It is, therefore, further contemplated that embodiments are not limited to certain implementation or hosting of misuse assessment mechanism 110 and that one or more portions or components of misuse assessment mechanism 110 may be employed or implemented as hardware, software, firmware, or any combination thereof. Further, as used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events Computing device 100 may host network interface device(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, Compact Disc-Read Only Memories (CD-ROMs), magneto-optical disks, ROMs, Random Access Memories (RAMs), Erasable Programmable Read Only Memories (EPROMs), Electrically Erasable Programmable Read Only Memories (EEPROMs), magnetic or optical cards, flash memory, or other type of media/machine-readable medium suitable for storing machine-executable instructions.

For example, when reading any of the apparatus, method, or system claims of this patent to cover a purely software and/or firmware implementation, at least one element of misuse assessment components 120, 130 and/or misuse assessment mechanism 110 may be expressly defined to include a non-transitory computer readable storage device or storage disk such as a memory, a digital versatile disk (DVD), a compact disk (CD), a Blu-ray disk, etc., including the software and/or firmware.

Moreover, one or more elements of misuse assessment components 120, 130 and/or misuse assessment mechanism 110 may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout this document, the term "user" may be interchangeably referred to as "viewer", "observer", "speaker", "person", "individual", "end-user", "developer", "programmer", "administrators", and/or the like. For example, in some cases, a user may refer to an end-user, such as a consumer accessing a client computing device, while, in some other cases, a user may include a developer, a programmer, a system administrator, etc., accessing a workstation serving as a client computing device. It is to be noted that throughout this document, terms like "graphics domain" may be referenced interchangeably with "graphics processing unit", "graphics processor", or simply "GPU"; similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document.

Further, throughout this document, terms like "request", "query", "job", "work", "work item", and "workload" are referenced interchangeably. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referenced as "work unit" or "draw", while "application" may be interchangeably referred to as "workflow" or simply "agent".

For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

Figure 2:
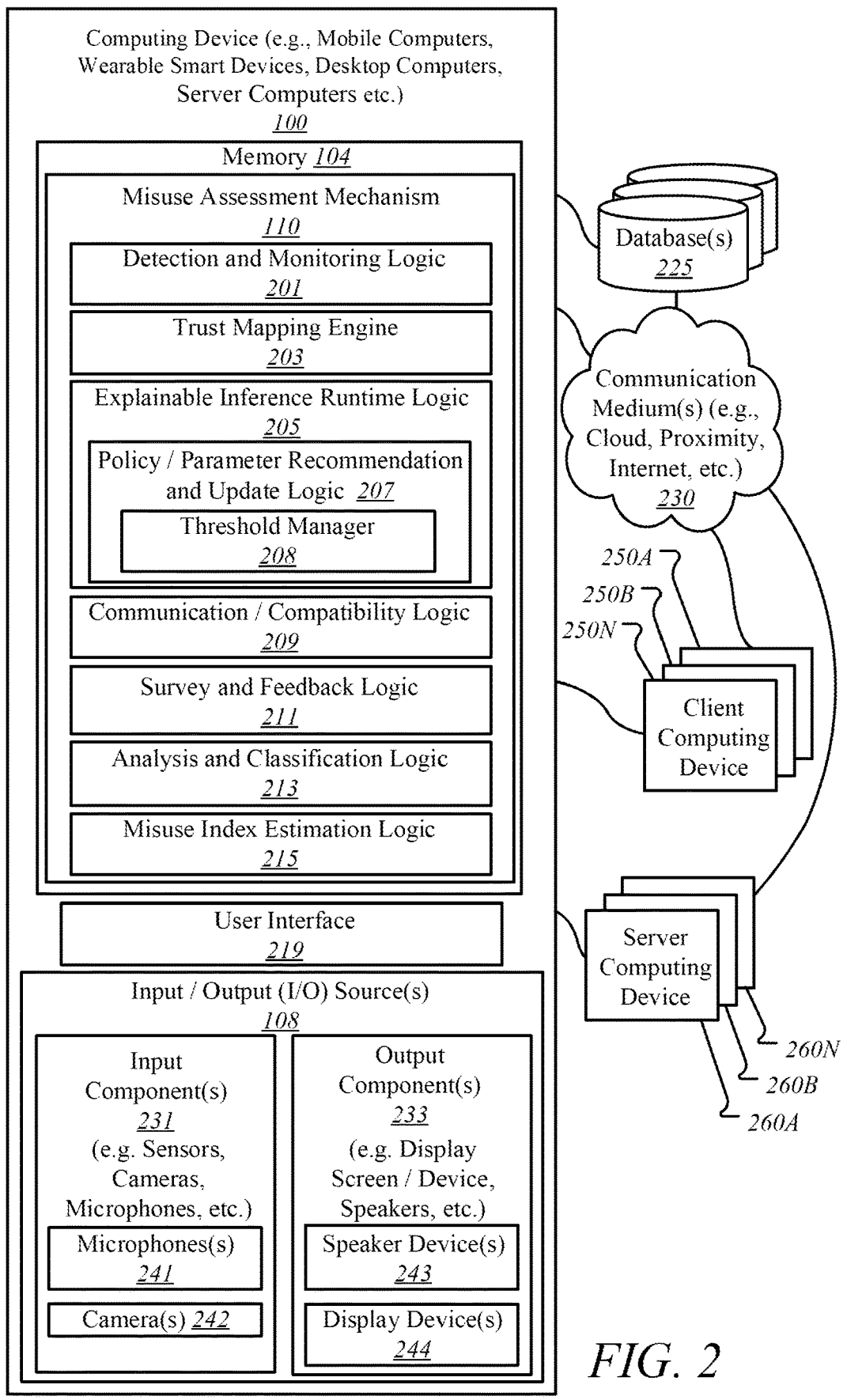
FIG. 2 illustrates a misuse assessment mechanism according to one embodiment.

FIG. 2 illustrates misuse assessment mechanism 110 of FIG. 1 according to one embodiment. For brevity, many of the details already discussed with reference to FIG. 1 are not repeated or discussed hereafter. In one embodiment, misuse assessment mechanism 110 may include any number and type of elements or components, such as (but not limited to): detection and monitoring logic 201; trust mapping engine 203; explainable inference (EXPI) runtime logic ("EXPI logic") 205 including policy/parameter recommendation and update logic ("RU logic") 207 including threshold manager 208; communication/compatibility logic 209; survey and feedback logic 211; analysis and classification logic 213; and misuse index estimation logic 215.

As an initial matter, as will be further illustrated and described with reference to FIG. 3B, embodiments are not limited to having misuse assessment mechanism 110 and/or one or more of misuse assessment components 120, 130 of FIG. 1 on any particular device, such as computing device 100. As illustrated, in one embodiment, misuse assessment mechanism and/or one or more of misuse assessment components 120, 130 are hosted by computing device 100. For example, in another embodiment, various client computing devices 250A, 250B, 250N and/or server computing devices 260A, 260B, 260N may host one or more elements of misuse assessment mechanism 110, while, in yet another embodiment, misuse assessment mechanism 110 may hosted entirely by multiple computing devices, such as client and/or server computing devices 250A, 250B, 250N and/or 260A, 260B, 260N, respectively.

Computing device 100 is further shown to include user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having input component(s) 231, such as camera(s) 242 (e.g., Intel® RealSense™ camera), microphone(s) 241, sensors, detectors, keyboards, mice, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, an intranet, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O source(s) 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software, hardware, firmware, and/or any combination thereof. For example, logic may itself be or include or be associated with circuitry at one or more devices, such as misuse assessment component 130 and/or misuse assessment component 120 hosted by application processor 112 and/or graphics processor 114, respectively, of FIG. 1 having to facilitate or execute the corresponding logic to perform certain tasks.

For example, as illustrated, input component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

Embodiments provide for a novel technique, as facilitated by misuse assessment mechanism 110 and/or one or more of misuse assessment components 120, 130, for estimating a misuse index for explainable machine learning models. In one embodiment, this novel misuse index is obtained by comparing or mapping the use of inference data with the source/field data and any metadata used for training purposes based on multiple features, such as (but not limited to): 1) range of input data, on many possible characteristics, that the inference is being exposed or compared to a training data set; 2) foreground image comparisons for features of interest (e.g., skin color for a range of faces in an image); 3) background condition differences of images and audios that do not match in training (even if the foreground does); 4) data similarity (on many factors like variability, range in various features, etc.); 5) number of objects of interest within sample inputs (e.g., inference happening on multiple faces when training images, where each image having one face); 6) image resolution, video frame rate, audio sampling rate, etc.; 7) other meta-data in training samples based on varying aspects, such as a context in which a sample was obtained (e.g., school pictures vs mug shots); and/or 8) miscellaneous data that is factored in, but not necessarily based on a comparison of training data with inference data; and/or the like.

It is contemplated that in machine learning, untrained neural network models are put through training processes using a given machine learning framework so that these models may be trained based on field data and any pertinent metadata as provided through training datasets. For example, detection and monitoring logic 201 may be used to detect, monitor, and obtain field data and any metadata from information obtained through one or more of (but not limited to) images, words, videos, audio, societal traditions, local cultures, acceptable and unacceptable customs, biases, blood types, diseases, blood types, races, ethnicities, nationalities, genders, classes, creeds, religious beliefs, governmental laws, institutional rules and regulations, organizational policies, expectations, predictions, etc. An example of field data may include information (e.g., age, race, breed, color, type, etc.) relating to an object (e.g., person, pet, furniture, etc.) in a scene (e.g., garden, room, etc.) obtained from an image captured by camera(s) 242, while an example of relevant metadata may include information (e.g., address, map, etc.) relating to an actual location (e.g., city, street, geographic coordinates, etc.) of that scene (e.g., garden, room, etc.) captured in that image.

It is further contemplated that once trained, these trained neural network models are then put to use (such as to perform tasks, infer things) based on their training and any new data that is offered to these trained models. Stated differently, inference provides fully optimized and appropriately weighted models to perform the tasks they are expected to perform based on their training, such as successfully distinguishing a dog from a car, predicting what type of car a buyer would purchase, etc.

However, as aforementioned, conventional techniques fail to tackle situation when there are discrepancies between training and inferring; stated differently, when things are not inferred according to training. In some cases, these discrepancies can be ignored as accidents or mistakes; however, in some other cases, such discrepancies could be regarded as misuses, even severe misuses, when they are not in compliance with the policies and parameters based on laws, ethics, traditions, cultures, etc.

For example, policies and parameters may be based on commonly-known or easily-found information ("common information"), such as federal and state/provincial laws, city ordinances, administrative rules and regulations (such as at airports, in parks, etc.), societal traditions, local cultures, religious obligations, etc. In one embodiment, such common information may be evaluated and used by RU logic 207 to offer policy/parameter recommendations (or updates to existing or previous policy/parameter recommendations) to threshold manager 208, where threshold manager 208 evaluates such recommendations and/or updates offered by RU logic 207 to set one or more policy/parameter thresholds.

In some cases, more precise, private, or specific information ("specific information") may be collected from users through surveys and feedbacks, as facilitated by survey and feedback logic 211. In one embodiment, such interaction between a user and misuse assessment mechanism 110 may be offered through one or more interfaces, such as user interface 219, where the one or more interfaces are offered to users through their accessible one or more computing devices, such as client computing devices 250A, 250B, 250N, server computing devices 260A, 260B, 260N.

For example, in one embodiment, users (e.g., developers, administrators, end-users, etc.) may be given surveys or questionnaires to offer their input or recommendations, such as with regard to their company/organization's policies and preferences, which can lead to more transparent inference policies. It is contemplated that an organization may include (but is not limited to) a company, a non-profit organization, a government entity, an educational institution, and/or the like. For example, a user associated with an organization may be directly asked about the purpose of the inference, such as the context in which the inference is to be used and at what level of generalization or specification; for example, there is a significant difference between a policy that allows for face identification (ID) for all passengers at airports as opposed to another policy that is limited to matching pilot faces with pilot license documents, etc. Further, these questionnaires may also be used to inquire about any risk exposure from mistaken inferences based on the required levels of confidence produced in an inference.

As described above with reference to common information, in one embodiment, any specific information, as obtained and evaluated through survey and feedback logic 211, is then forwarded on to RU logic 207, where RU logic 207 evaluates and uses the specific information to offer policy/parameter recommendations (or updates to existing or previous policy/parameter recommendations) to threshold manager 208. In one embodiment, threshold manager 208 then evaluates these recommendations and/or updates offered by RU logic 207 to set one or more policy/parameter thresholds.

In one embodiment, as will be further described in this document, these policy/parameter thresholds are used as the base for mapping training data to inference uses, as facilitated by trust mapping engine 203. Any discrepancies between the training data and the inference uses are analyzed and classified as one or more of minor misuses, major misuses, errors, exceptions, exemptions, etc., as facilitated by analysis and classification logic 213. Any data relating to misuses is then forwarded on to misuse index estimation logic 215 to estimate an index according to the severity and/or importance of misuses so that appropriate actions may be recommended and/or taken to stop a current misuse, prevent a future misuse, etc.

As previously described, misuses may range from simple errors to acceptable exceptions to major misuses and therefore, to allow for and ensure accuracy and confidence in a misuse index, in some embodiments, trust mapping engine 203 may trigger an inference procedure to perform sampling over inferences produced from the same input and the same model by using one or more of (but not limited to): (a) random dropouts; and (b) varying model parameters over narrow ranges centered around their expectations, so that the required level of confidence (such as to mitigate higher risk) may be obtained by sampling over a range of inferences.

Further, for example, inputs from users may provide exceptions to certain policies, procedures, etc., that may then be mapped or checked against conclusions that are commonly made, as facilitated by trust mapping engine 203. Such exception matching may be used by trust mapping engine 203 to put forth comparison statistics relating to expected positives as opposed to actual positives in an inference use (e.g., an expectation may be set that skin color of people being matched with a watch list is consistent with the proportion of skin color in faces tested).

Further, in one embodiment, training may be augmented and tracked to identify key features (such as by tracking activations of neurons and neuron groups across one or more channels) and any corresponding trained weights at training phases, as facilitated by detection and monitoring logic 201. Similarly, during inference for field data, any activations and/or attributions of neurons associated with the field data are tracked to then be compared or mapped with the training data sets and metadata, as facilitated by trust mapping engine 203, where the results of which may then be used to estimate a misuse index as facilitated by misuse index estimation logic 215. As described earlier, contents of this misuse index may then be matched against any policy/parameter thresholds to determine the severity of misuses and appreciate decisions that may be enforced to allow, curb, or stop any of the misuses. Further, in some embodiments, one or more of the metadata from training, inferences, misuse index, etc., may be tracked and maintained in a distributed ledger for the purposes of journaling, auditing, etc.

With regard to mapping or comparing of training data with inferences, as facilitated by trust mapping engine 203, consider an XAI-based EXPI associated with sensed or tracked field data, d1 ... dn, (e.g., images, audio, language, etc.), having sensitivity level L=(l1, ... , ln), where d1 denotes data at sensitivity level l1 (e.g., unclassified), l2 denotes data at a second sensitivity level (e.g., sensitive), and classifications l3, l4, ... n, respectively, at higher classification levels.

Now, assuming EXPI relates to distribution of applications, such as a in A={a1, a2, ... an} that classifies data in (d1 ... dn) with sensitivity levels L such that a(DL)={(d1, l1), (d2,l2), ... , (dn,ln)}, and where a1→(D1L1) is a first datum having a first sensitivity level, while and a second sensitivity level exists for a second datum at application a2 such that a2→(d2l2). Stated differently, this novel technique provides for a type of graduated model that incorporates differential inferencing to be delivered to inferences whose quality (and correspondingly, computational efforts) may vary according to sensitivity levels. Further, for example, QoS represents the expected Quality-Of-Service, where QoS has parametrized costs (such as attributes, performance, etc.), transaction clearing costs, etc.

In one embodiment, an EXPI transaction may be based on a mapping function, F, such that EXPI=F (TRUST_MAPPER (D, R, W), Tx, A, QoS, M), where M represents machine learning feedback to be incorporated for a next iteration of scheduling calculations, where TRUST_MAPPER ( ) is a function that computes a trust score or probability of mapping the training meta data (e.g., activations, attributions, etc.) with an explainable inference, where D represents the distributed ingredients required for the explainable inference application, A, where W represents the set of applications in A that complies with whitelist configuration known to be trustworthy. For example, the whitelist may be published on a public blockchain and where security operations may be attestations, whitelist checks, anti-virus scanning, firewall scanning, etc., where R represents the risk that is at stake; for example, any value or opportunity cost resulting from performing the transaction, Tx.

As described above, any mismatches or discrepancies between training data and inferences may be regarded as misuses (or at least errors, exceptions, etc.), where a misuse index offers and lists not only these misuses, but also their classifications and any specific potential issues that can help users (e.g., developers) focus on those issues that may need some action to stop or curb the invalid use of inference, correct an inference that is classified as an error, or allow the inference to continue when classified as an exception/exemption, etc. Further, as discussed earlier, in some embodiments, training datasets may be suitably augmented, so that user inputs with less represented features and/or high-risk outputs (as labeled) are intentionally increased in number with the application of filters that randomly obscure background data in each data element.

Moreover, a model may include a labeled-risk, a labeled-rare output signal, etc., for which such model gets implicitly trained. Such factors can bias the training to compensate for the less represented and/or the more sensitive inferences, and also train the model to signal the possible presence of features leading to rarity and risk assessments as of training time.

As described earlier, any training/field data used for training of an untrained neural network model is expected to be labeled with metadata (such as context in which the data sample was obtained), then the training data samples are analyzed for characteristics of actual data (e.g., background characteristics of images, color levels, number of objects ion image, audio sampling, etc.).

In one embodiment, a misuse index is estimated by misuse index estimation logic 215 based on factors with various weightings. One such index factor or component may include or deal with background image (such as parts of the image that do not include the foreground object of interest) color (or light or patterns) spectrum distribution similarity. For example, as facilitated by trust mapping engine 203, in this case, a summarized spectrum of field data images is compared with a sample of training data spectrum as opposed to using the image similarity measures on those image features that are not in the object of interest, which is often extracted from images in many visual classifiers.

In one embodiment, trust mapping engine 203 functions in real-time such that any key activations or attributions of a feature set that is observed through an EXPI, as facilitated by EXPI logic 205, may be quantified and compare against another feature set observed during training (such as using tolerance profiles from training). Similarly, threshold manager 208 may use the misuse index to identify whether any of the misuses exceed the current policy-based thresholds for specific profiles from training characteristics. If such exceeds are noted, then a policy-based action may be recommended in terms of adapting the inference parameters to align with policy recommendations and perform journaling of transactions using a ledger, such as a publicly-distributed ledger, for audit and other purposes.

Another example of index factors or components may concern with matching of skin color ranges between training and field data as measured by shades of pixels detected within face boxes, where, again, any field data may be automatically compared with any training data samples to help reveal possible misalignments, such as in cases involving AI-based racial profiling.

Another example of index factors or components my concern audio data, including sound clips, audio streams, etc., that are used as training data for training purposes, such as a gunshot recognition algorithm may be pre-analyzed to add metadata, such as sampling rate, clip length, background noise characteristics, etc., to compare with the actual field data.

As described earlier, in some embodiments, index factors or components may be based on user inputs, such as a developer may be queried to input aspects of a context in which an inference is used. For example, a developer may name the location of airports where a face classifier is expected to be used. With such user inputs, for example, a misuse index may be estimated to include a measure of distance comparisons between field data and training data, based on any metadata coordinates for training. Stated differently, this knowledge of which airports might use face classifiers is considered when mapping or comparing training data with inferences so that any airport that is different from or determined to be far away from the airports pointed out by the developer may be regarded as one indication of misuse.

It is contemplated that any use of such index factors may necessitate normalization to enable misuse assessment mechanism 110 to use differences that are meaningful (e.g., what is a significant color spectrum background difference), where such normalizations may be based on common information that are regarded as reliable.

Referring back to I/O source(s) 108, it is contemplated that embodiments are not limited to any number or type of microphone(s) 241, camera(s) 242, speaker(s) 243, display(s) 244, etc., for capture or presentation of data. For example, as facilitated by detection and monitoring logic 201, one or more of microphone(s) 241 may be used to detect speech or sound simultaneously from users, such as speakers. Similarly, as facilitated by detection and monitoring logic 201, one or more of camera(s) 242 may be used to capture images or videos of a geographic location (whether that be indoors or outdoors) and its associated contents (e.g., furniture, electronic devices, humans, animals, trees, mountains, etc.) and form a set of images or video streams.

Similarly, as illustrated, output component(s) 233 may include any number and type of speaker(s) or speaker device(s) 243 to serve as output devices for outputting or giving out audio from computing device 100 for any number or type of reasons, such as human hearing or consumption. For example, speaker(s) 243 work the opposite of microphone(s) 241 where speaker(s) 243 convert electric signals into sound.

Further, input component(s) 231 may include any number or type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Input component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 may include any number and type of context sensors (e.g., linear accelerometer) for sensing or detecting any number and type of contexts (e.g., estimating horizon, linear acceleration, etc., relating to a mobile computing device, etc.). For example, input component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 231 may include (without limitation): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, database(s) 225, and/or communication medium(s) 230, etc., and any number and type of other computing devices 250A, 250B, 250C, 260A, 260B, 260N (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, firmware, and/or any combination thereof. In one example, "logic" may refer to or include a software component that works with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "artificial intelligence", "AI", "explainable AI", "XAI", "neural network model", "machine learning model", "deep learning model", "misuse", "misuse index", "misuse index estimation", "training data", "field data", "inference uses", "trust mapping", "policy/parameter", "threshold", "survey", "feedback", "neuron", "neural network", "deep neural network", "recurrent deep neural network", "functions", "factors", "depth", "pixel depth", "creating", "training", "inferencing", "classifying", "estimating", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from misuse assessment mechanism 110 and/or one or more of misuse assessment components 120, 130 of FIG. 1 to facilitate various embodiments including adding, removing, and/or enhancing certain features. For brevity, clarity, and ease of understanding of misuse assessment mechanism 110 and/or one or more of misuse assessment components 120, 130 of FIG. 1, many of the standard and/or known components, such as those of a computing device are not shown or discussed here. It is contemplated that embodiments, as described herein, are not limited to any technology, topology, system, architecture, and/or standard and are dynamic enough to adopt and adapt to any future changes.

Figure 3A:
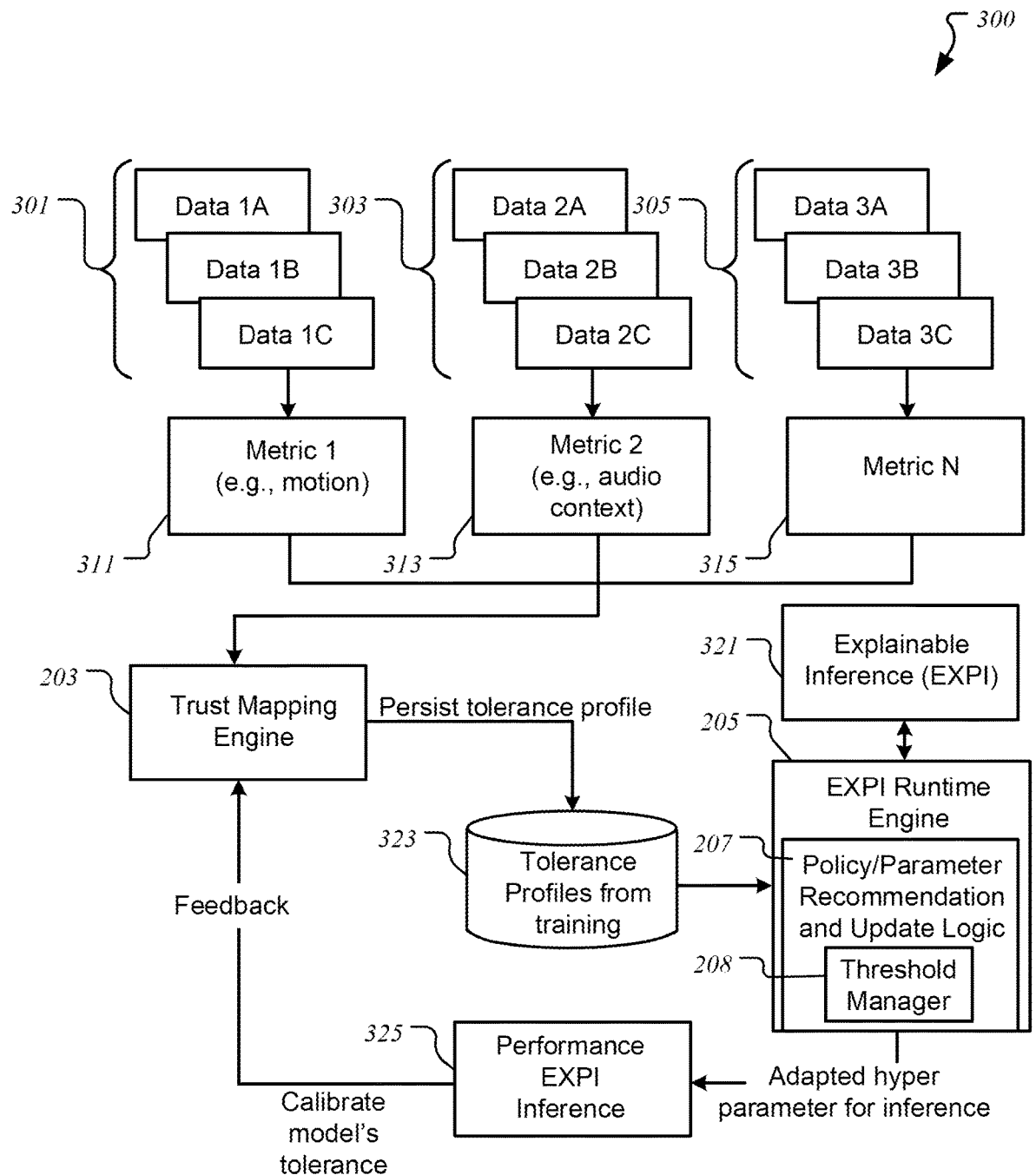
FIG. 3A illustrates a real-time transaction sequence for assessment of misuses in AI models according to one embodiment.

FIG. 3A illustrates a real-time transaction sequence 300 for assessment of misuses in AI models according to one embodiment. For the sake of brevity, many of the details previously mentioned or discussed with reference to FIGS. 1-2 may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by misuse assessment mechanism 110 and/or one or more of misuse assessment components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

The illustrated embodiment of transaction sequence 300 shows trust mapping engine 203 functioning in real-time, such that any activations and/or attributions of a feature set, as facilitated by EXPI 321, are qualified and subsequently compared against a feature set observed during training that are maintained at and accessible as tolerance profiles at database 323. As illustrated, for example, data sets, such as data 1A, 1B, 1C 301, 2A, 2B, 2C 303, and/or 3A, 3B, 3C 305, etc., are received as captured through various I/O sources 108 of FIG. 1, such as cameras, microphones, etc., and used for training purposes and classified as metric 1 311 representing motion (e.g., video), metric 2 313 representing audio context (e.g., audio), while still images and other relevant data (e.g., metadata), may be classified as metric N 315.

In one embodiment, trust mapping engine 203 may work, in real-time, to quantify a set of activations and/or attributions, as facilitated by EXPI 321, as further facilitated by EXPI engine 205, and map them against a set of features observed during training and accessible as tolerance profiles from training at database 323. Any discrepancies detected during mapping of training datasets and inference uses may be regarded as misuses or mistakes that are then used to build a misuse index, where RU logic 207 of EXPI engine 205 may be triggered to use the misuse index to compare any misuses with policy/parameter recommendations based on policy/parameters thresholds as configured and defined by threshold manager 208.

In one embodiment, this comparison can be used to identify any misuses that do not comply with the policy/parameter recommendations (such as if a training characteristic and/or an inference use exceeds a policy threshold). Any violation of or incompatibility with the policy/parameter recommendations may be noted and used by threshold manager 208 to, in one embodiment, adjust the inference parameters, via performance EXPI inference 325, to align with the policy/parameter recommendations. In another embodiment, policy/parameter recommendations may be altered to accommodate any changes to training data and/or inference uses. Any such adjustments to the policy/parameter recommendations lead to new or updated policy/parameter thresholds and are adapted to calibrate the pertinent neural network model's tolerance, through EXPI 321, and communicated back to trust mapping engine 203 as feedback.

Figure 3B:
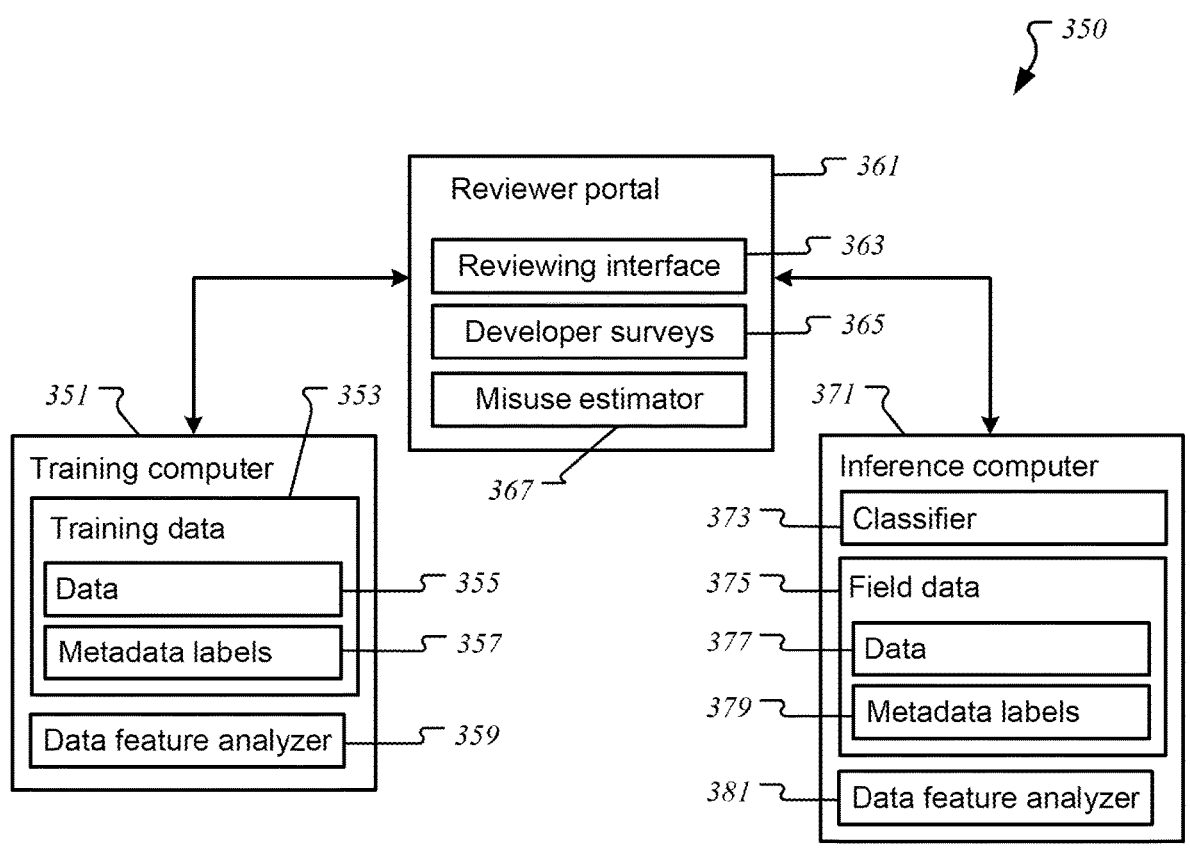
FIG. 3B illustrates a system for assessment of misuses in AI models according to one embodiment.

FIG. 3B illustrates a system 350 for assessment of misuses in AI models according to one embodiment. For the sake of brevity, many of the details previously mentioned or discussed with reference to FIGS. 1-3A may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by misuse assessment mechanism 110 and/or one or more of misuse assessment components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As described earlier with regard to FIG. 2, misuse assessment mechanism 110 and/or one or more of misuse assessment components 120, 130 of FIG. 1 may not be limited to any particular placement or computing device. For example, as illustrated, training computer 351, reviewer portal 361, and inference computer 371 may include one or more of computing device 100, client computing devices 250A, 250B, 250N, and/or server computing devices 260A, 260B, 260N of FIG. 2. In the illustrated embodiment, training computer 351 may be used to obtain training data 353 including data 355 and metadata labels 357 for training purposes, where data 355 and metadata labels 357 may be analyzed using data feature analyzer 353 as facilitated by analysis and classification logic 213 of FIG. 2.

Similarly, in one embodiment, inference computer 371 may be used for capturing field data 375 including data 377 and metadata labels 379 for inference purposes and are then classified and analyzed by classifier 373 and data feature analyzer 381, respectively, as facilitated by analysis and classification logic 213 of FIG. 2. In some embodiments, upon completing inference, including any classification and analysis, field data 375 may then be communicated over to training computer 351, where field data 375 may then be used as training data 353 for subsequent or future training of one or more machine learning models. Further, as illustrated, another computing device, such as reviewer portal 361, may be used for offering reviewing interface 363 that is accessible to users for reviewing and experiencing XAI-based applications, information, etc., and communicating policy inputs, developer surveys 365, etc., back to reviewing portal 361.

For example, reviewing portal 361 may be used for supplying developer surveys 365 to users, receiving developer surveys 365 back from the users, and hosting and maintaining surveys 365 for later use by misuse estimator 367 for estimating misuses, as facilitated by misuse index estimation logic 215 of FIG. 2 along with one or more other components of misuse assessment mechanism 110 and/or one or more of misuse assessment components 120, 130 of FIG. 2 for setting policy/parameter recommendations and thresholds, etc.

Figure 3C:
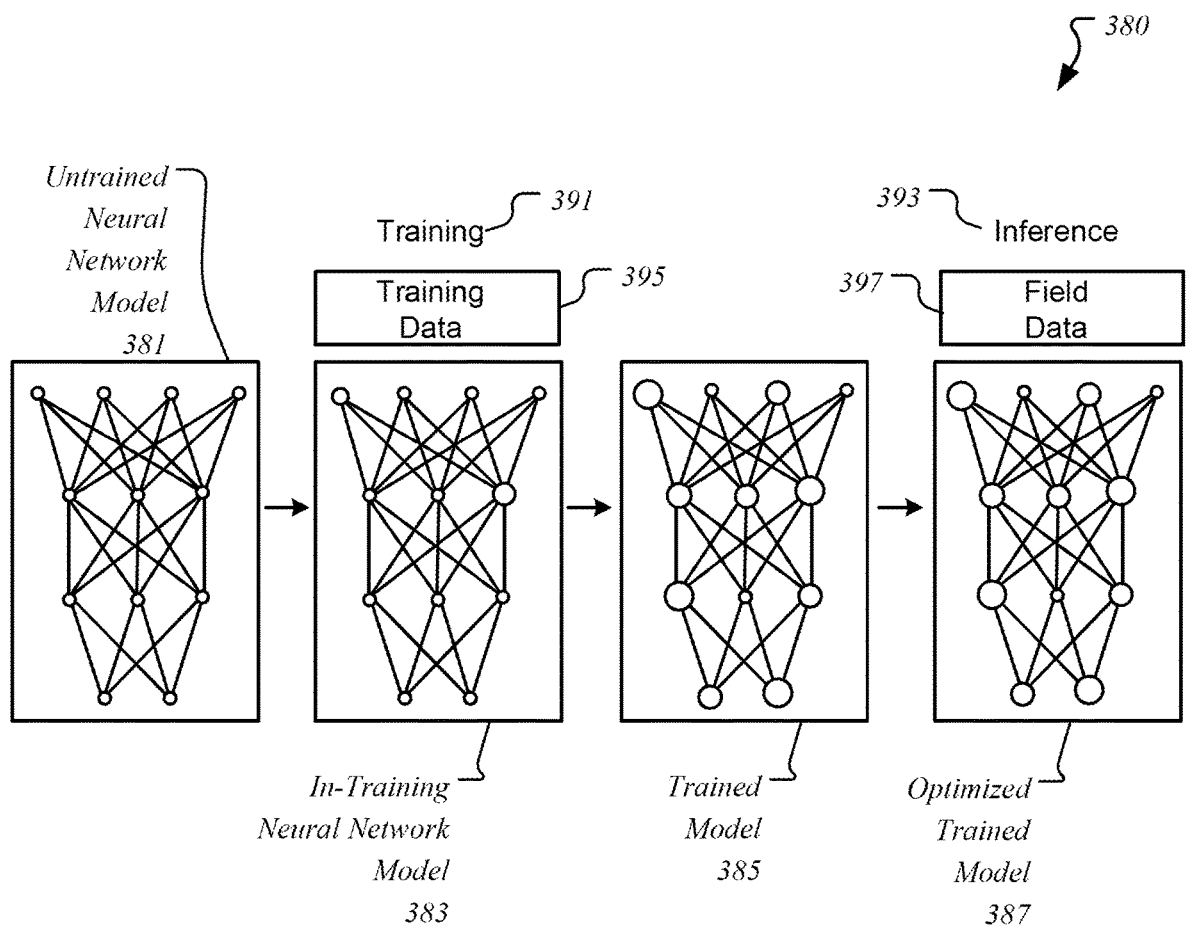
FIG. 3C illustrates a transaction sequence for training and inferring in machine learning environments according to one embodiment.

FIG. 3C illustrates a transaction sequence 380 for training and inferring in machine learning environments according to one embodiment. For the sake of brevity, many of the details previously mentioned or discussed with reference to FIGS. 1-3B may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by misuse assessment mechanism 110 and/or one or more of misuse assessment components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As illustrated, transaction sequence 380 begins with detecting and identifying untrained neural network model 381 and subsequently, putting it through training 391. During training 391, in-training neural network model 383 is trained within a machine/deep learning framework using training data 395 to learn new tasks, functions, and/or capabilities using any existing training data 395. Training 391 produces trained model 385 that is learned in that it has learned new performance and other capabilities based on training data 395.

The illustrated transaction sequence 380 continues with creation of inference 393 for applying any new capabilities, features, etc., to trained model 385 using any new field data 397 such that optimized trained model 387 is generated with even better capabilities and features to perform its given tasks. As discussed throughout this document, in one embodiment, any discrepancies between training data and inference uses are identified as discrepancies that are then classified as misuses, mistakes, exceptions, etc., in a misuse index.

Figure 4:
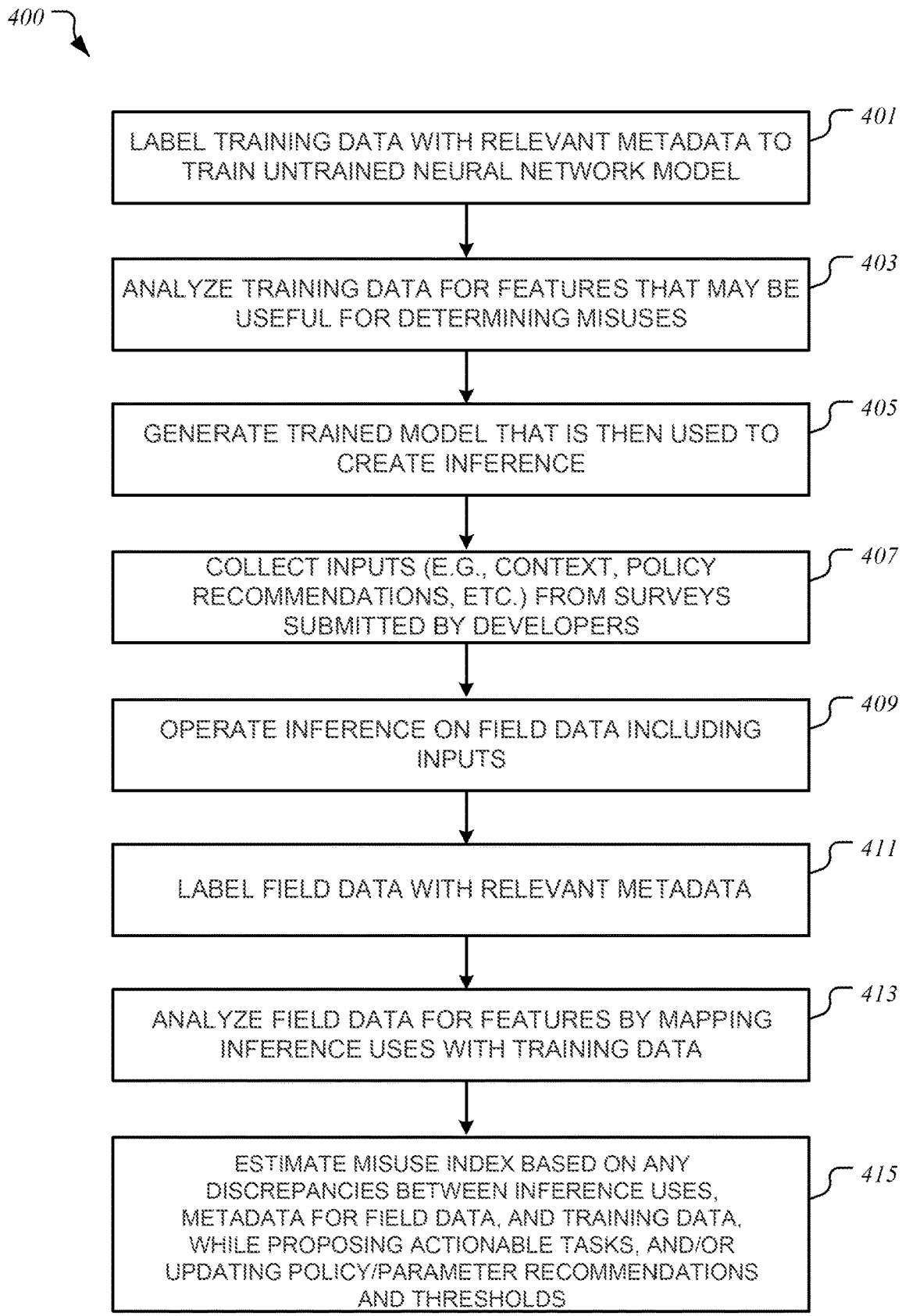
FIG. 4 illustrates a method for assessment of misuses in AI models according to one embodiment.

FIG. 4 illustrates a method 400 for assessment of misuses in AI models according to one embodiment. For the sake of brevity, many of the details previously mentioned or discussed with reference to FIGS. 1-3C may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by misuse assessment mechanism 110 and/or one or more of misuse assessment components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

Method 400 begins at block 401 with labeling of training data with relevant metadata (such as context in which a data sample was obtained, location where the scene associated with the data sample took place, etc.). At block 403, this training data is analyzed for characteristics or features, as described earlier with respect to FIG. 2, that are then used for misuse estimation, where the features are analyzed by matching against the actual data (e.g., background characteristics of images, color levels, number of objects in images, audio sampling, etc.). At block 405, a trained neural network model, such as an XAI machine learning model, is created, which, in turn, creates an inference. This inference, in one embodiment, is further based on and takes into consideration information obtained from developer surveys, such as information including policy expectations, context, generalizability, etc., provided by the developers at block 407.

In one embodiment, the inference then operates on or is applied to any field data associated with the trained model at block 409, where, at block 411, this field data is then labeled with the relevant metadata earlier used in labeling the training data. As done previously with the training data, at block 413, any characteristics or features associated with the field data may now be analyzed against the training data to determine any misuses based on any discrepancies found in mapping the training data with the inference uses. At block 415, in one embodiment, a misuse index is estimated based on the misuses (such as any discrepancies between interference uses, metadata for field data, and/or training data, etc.), while actionable items are proposed based on the policy/parameter thresholds, policy feedbacks, etc., and for updating any existing policy/parameter recommendations, thresholds, etc.

As described with reference to FIG. 2, in one embodiment, misuse index may be calculated based on factors with varying training weights, such as background images (where, for example, parts of an image may not include a foreground object of interest) color (or light or patterns) spectrum distribution similarity measures. Any image similarity measures may be based on image features not in the object of interest, which is often extracted from images in several visual classifiers, where the summarized spectrum of field data images may be compared with a sample of training data spectrum. Other factors may include (but not limited to) matching of skin color ranges between training data and field data as measured by shades of pixels detected within face boxes, where any field data is automatically compared with training data samples to reveal misalignments, such as in cases of racial profiling using AI.

Similarly, with regard to audios, any audio training data used for training, for example, a gunshot recognition algorithm may be pre-analyzed to add metadata, such as sampling rate, clip length, background noise, characteristics, etc., to compare with any field data. Further, for example, developers may be queried to input aspects of the context in which the inference may be used, such as a developer may name the location of airports where face classification may be used. A misuse index may include a measure of distance comparisons between any field data and training data based on coordinates in the metadata for training versus inference for indications of misuses.

Figure 5:
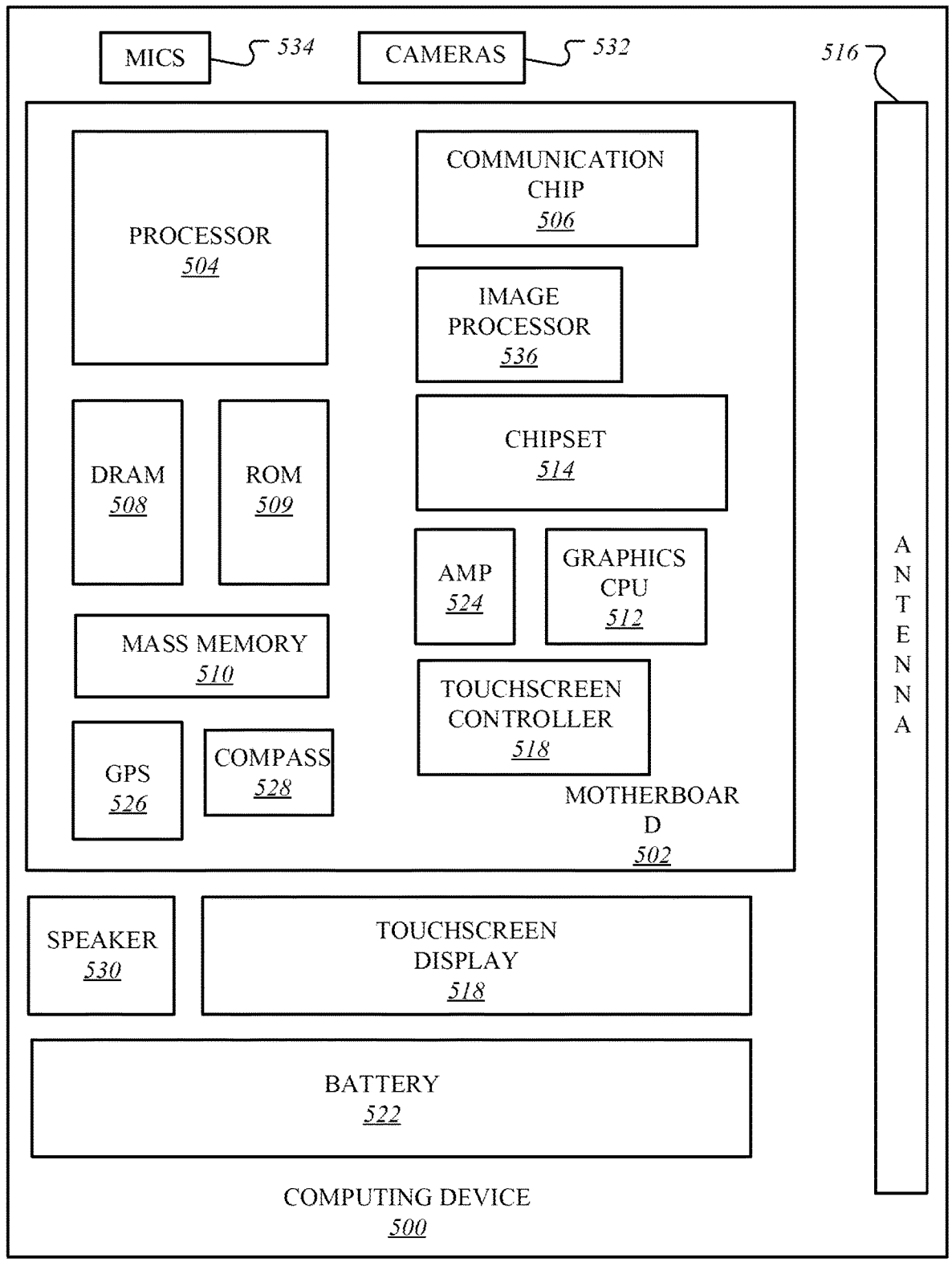
FIG. 5 illustrates a computing device capable of supporting and implementing one or more embodiments.

FIG. 5 illustrates a computing device 500 capable of supporting and implementing one or more embodiments. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
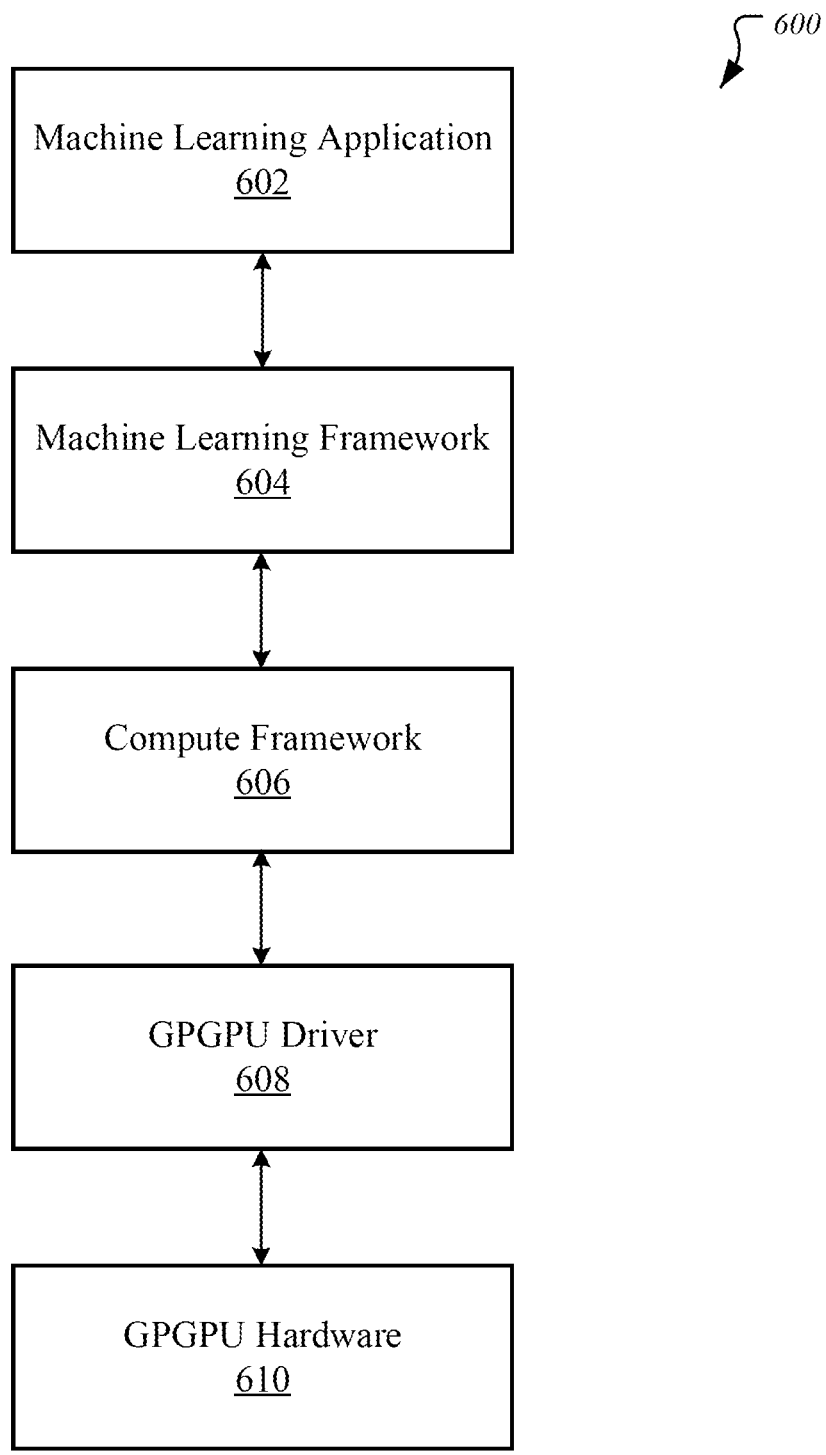
FIG. 6 illustrates a machine learning software stack according to one embodiment.

FIG. 6 illustrates a machine learning software stack 600 according to one embodiment. Although FIG. 6 illustrates a software stack for general-purpose GPU (GPGPU) operations, a machine learning software stack is not limited to this example and may include, for also, a machine learning software stack for CPU operations. A machine learning application 602 can be configured to train a neural network using a training dataset or to use a trained deep neural network to implement machine intelligence. The machine learning application 602 can include training and inference functionality for a neural network and/or specialized software that can be used to train a neural network before deployment. The machine learning application 602 can implement any type of machine intelligence including but not limited to image recognition, mapping and localization, autonomous navigation, speech synthesis, medical imaging, or language translation.

Hardware acceleration for the machine learning application 602 can be enabled via a machine learning framework 604. The machine learning framework 604 can provide a library of machine learning primitives. Machine learning primitives are basic operations that are commonly performed by machine learning algorithms. Without the machine learning framework 604, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 604. Exemplary primitives include tensor convolutions, activation functions, and pooling, which are computational operations that are performed while training a convolutional neural network (CNN). The machine learning framework 604 can also provide primitives to implement basic linear algebra subprograms performed by many machine-learning algorithms, such as matrix and vector operations.

The machine learning framework 604 can process input data received from the machine learning application 602 and generate the appropriate input to a compute framework 606. The compute framework 606 can abstract the underlying instructions provided to the GPGPU driver 608 to enable the machine learning framework 604 to take advantage of hardware acceleration via the GPGPU hardware 610 without requiring the machine learning framework 604 to have intimate knowledge of the architecture of the GPGPU hardware 610. Additionally, the compute framework 606 can enable hardware acceleration for the machine learning framework 604 across a variety of types and generations of the GPGPU hardware 610.

Machine Learning Neural Network Implementations

The computing architecture provided by embodiments described herein can be trained and learn to perform the types of parallel processing that are computationally equivalent to training and deploying neural networks for machine learning. The computing architecture provided by embodiments described herein differs from Deep Neural Networks (DNNs), Convolutional Neural Networks or Recurrent Neural Networks (RNNs) with respect to both the functionality types of neurons deployed and with respect to the computation steps which the training process comprises. Even though the computing architecture provided differs from neural networks such as CNNs, DNNs or RNNs, some of the computations performed by this architecture may be equivalent to the computations performed by neural networks such as CNNs, DNNs or RNNs. Other computations performed by the computing architecture provided may not be possible if attempted by neural networks such as CNNs, DNNs or RNNs. This is the reason why the computing architecture provided by embodiments described herein addresses the robustness and precision issues associated with neural networks such as CNNs, DNNs or RNNs. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 7A:
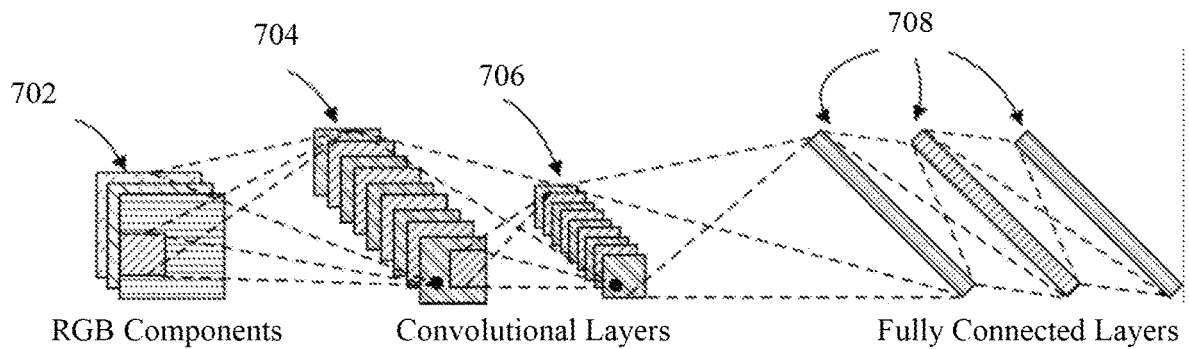
FIG. 7A illustrates neural network layers according to one embodiment.
Figure 7B:
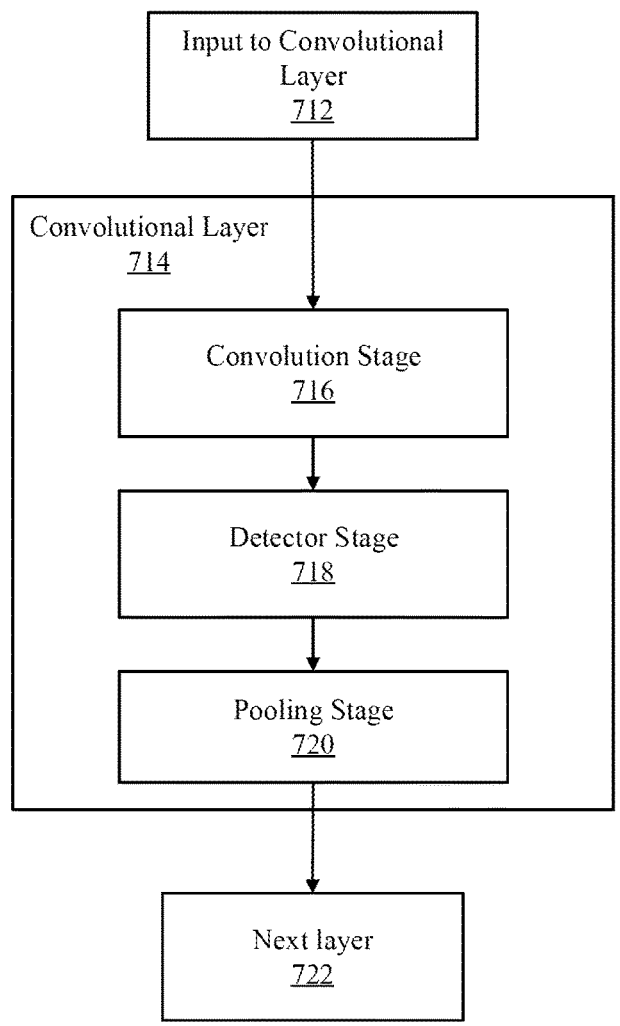
FIG. 7B illustrates computation stages associated with neural network layers according to one embodiment.

FIG. 7A illustrates neural network layers according to one embodiment. FIG. 7B illustrates computation stages associated with neural network layers according to one embodiment. FIG. 7A illustrates various layers within a CNN. As shown in FIG. 7A, an exemplary CNN used to model image processing can receive input 702 describing the red, green, and blue (RGB) components of an input image. The input 702 can be processed by multiple convolutional layers (e.g., first convolutional layer 704, second convolutional layer 706). The output from the multiple convolutional layers may optionally be processed by a set of fully connected layers 708. Neurons in a fully connected layer have full connections to all activations in the previous layer, as previously described for a feedforward network. The output from the fully connected layers 708 can be used to generate an output result from the network. The activations within the fully connected layers 708 can be computed using matrix multiplication instead of convolution. Not all CNN implementations are make use of fully connected layers 708. For example, in some implementations the second convolutional layer 706 can generate output for the CNN.

The convolutional layers are sparsely connected, which differs from traditional neural network configuration found in the fully connected layers 708. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 7B illustrates exemplary computation stages within a convolutional layer of a CNN. Input to a convolutional layer 712 of a CNN can be processed in three stages of a convolutional layer 714. The three stages can include a convolution stage 716, a detector stage 718, and a pooling stage 720. The convolution layer 714 can then output data to a successive convolutional layer. The final convolutional layer of the network can generate output feature map data or provide input to a fully connected layer, for example, to generate a classification value for the input to the CNN.

In the convolution stage 716 performs several convolutions in parallel to produce a set of linear activations. The convolution stage 716 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 716 defines a set of linear activations that are processed by successive stages of the convolutional layer 714.

The linear activations can be processed by a detector stage 718. In the detector stage 718, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0, x)$, such that the activation is thresholded at zero.

The pooling stage 720 uses a pooling function that replaces the output of the second convolutional layer 706 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 720, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 714 can then be processed by the next layer 722. The next layer 722 can be an additional convolutional layer or one of the fully connected layers 708. For example, the first convolutional layer 704 of FIG. 7A can output to the second convolutional layer 706, while the second convolutional layer can output to a first layer of the fully connected layers 708.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate misuse index for explainable artificial intelligence in computing environments, the apparatus comprising: one or more processors to: map training data with inference uses in a machine learning environment, wherein the training data is used for training a machine learning model; detect, based on one or more policy/parameter thresholds, one or more discrepancies between the training data and the inference uses; classify the one or more discrepancies as one or more misuses; and create a misuse index listing the one or more misuses.

Example 2 includes the subject matter of Example 1, wherein the inference uses are based on field data captured using one or more capturing devices including one or more of a camera, a microphone, and one or more sensors, wherein the training data and the field data are labeled with metadata to identify detailed contents relating to one or more of the training data and the field data, wherein the machine learning environment is part of an explainable artificial intelligence (XAI) environment.

Example 3 includes the subject matter of Examples 1-2, wherein the one or more processors are further to: determine the one or more misuses to be one or more errors or one or more policy/parameter-altering acts; modify the misuse index to distinguish between the one or more errors and the one or more policy/parameter-altering acts; and propose actionable tasks to respond to the one or more policy/parameter-altering acts, wherein the actionable tasks include one or more of modifying the one or more policy/parameter thresholds, pausing the one or more policy/parameter-altering acts, and issuing one or more warnings to prevent future occurrences of the one or more policy/parameter altering acts.

Example 4 includes the subject matter of Examples 1-3, wherein the one or more policy/parameter thresholds are based on one or more features including one or more of governmental laws, administrative rules and regulations, organizational policies, cultural norms, societal customs, and ethical expectations, wherein the one or more policy/parameter thresholds are dynamically modified based on changes in the one or more features, wherein the one or more features are extracted from one or more of the training data, the field data, the metadata, and user inputs.

Example 5 includes the subject matter of Examples 1-4, wherein the one or more processors are further to: transmit one or more surveys to one or more computing devices over one or more communication mediums, wherein the one or more surveys are used to collect the user inputs from one or more users having access to the one or more computing devices, wherein the user inputs includes one or more of policy contexts, policy reasons, and policy recommendations; evaluate the one or more policy/parameter thresholds based on the user inputs; and modify the one or more policy/parameter thresholds based on the user inputs.

Example 6 includes the subject matter of Examples 1-5, wherein the one or more processors are further to adjust the detection of the one or more discrepancies based on the one or more modified policy/parameter thresholds.

Example 7 includes the subject matter of Examples 1-6, wherein the one or more processors include one or more of a graphics processor and an application processor, wherein the one or more processors are co-located on a common semiconductor package.

Some embodiments pertain to Example 8 that includes a method facilitating facilitate misuse index for explainable artificial intelligence in computing environments, the method comprising: mapping training data with inference uses in a machine learning environment, wherein the training data is used for training a machine learning model; detecting, based on one or more policy/parameter thresholds, one or more discrepancies between the training data and the inference uses; classifying the one or more discrepancies as one or more misuses; and creating a misuse index listing the one or more misuses.

Example 9 includes the subject matter of Example 8, wherein the inference uses are based on field data captured using one or more capturing devices including one or more of a camera, a microphone, and one or more sensors, wherein the training data and the field data are labeled with metadata to identify detailed contents relating to one or more of the training data and the field data, wherein the machine learning environment is part of an explainable artificial intelligence (XAI) environment.

Example 10 includes the subject matter of Examples 8-9, further comprising: determining the one or more misuses to be one or more errors or one or more policy/parameter-altering acts; modifying the misuse index to distinguish between the one or more errors and the one or more policy/parameter-altering acts; and proposing actionable tasks to respond to the one or more policy/parameter-altering acts, wherein the actionable tasks include one or more of modifying the one or more policy/parameter thresholds, pausing the one or more policy/parameter-altering acts, and issuing one or more warnings to prevent future occurrences of the one or more policy/parameter altering acts.

Example 11 includes the subject matter of Examples 8-10, wherein the one or more policy/parameter thresholds are based on one or more features including one or more of governmental laws, administrative rules and regulations, organizational policies, cultural norms, societal customs, and ethical expectations, wherein the one or more policy/parameter thresholds are dynamically modified based on changes in the one or more features, wherein the one or more features are extracted from one or more of the training data, the field data, the metadata, and user inputs.

Example 12 includes the subject matter of Examples 8-11, further comprising: transmitting one or more surveys to one or more computing devices over one or more communication mediums, wherein the one or more surveys are used to collect the user inputs from one or more users having access to the one or more computing devices, wherein the user inputs includes one or more of policy contexts, policy reasons, and policy recommendations; and evaluating the one or more policy/parameter thresholds based on the user inputs; modifying the one or more policy/parameter thresholds based on the user inputs.

Example 13 includes the subject matter of Examples 8-12, further comprising adjusting the detection of the one or more discrepancies based on the one or more modified policy/parameter thresholds.

Example 14 includes the subject matter of Examples 8-13, wherein the method is facilitated by one or more processors including one or more of a graphics processor and an application processor, wherein the one or more processors are co-located on a common semiconductor package.

Some embodiments pertain to Example 15 that includes a data processing system comprising memory; and one or more processors coupled to the memory, the one or more processors to: map training data with inference uses in a machine learning environment, wherein the training data is used for training a machine learning model; detect, based on one or more policy/parameter thresholds, one or more discrepancies between the training data and the inference uses; classify the one or more discrepancies as one or more misuses; and create a misuse index listing the one or more misuses.

Example 16 includes the subject matter of Example 15, wherein the inference uses are based on field data captured using one or more capturing devices including one or more of a camera, a microphone, and one or more sensors, wherein the training data and the field data are labeled with metadata to identify detailed contents relating to one or more of the training data and the field data, wherein the machine learning environment is part of an explainable artificial intelligence (XAI) environment.

Example 17 includes the subject matter of Examples 15-16, wherein the one or more processors are further to: determine the one or more misuses to be one or more errors or one or more policy/parameter-altering acts; modify the misuse index to distinguish between the one or more errors and the one or more policy/parameter-altering acts; and propose actionable tasks to respond to the one or more policy/parameter-altering acts, wherein the actionable tasks include one or more of modifying the one or more policy/parameter thresholds, pausing the one or more policy/parameter-altering acts, and issuing one or more warnings to prevent future occurrences of the one or more policy/parameter altering acts.

Example 18 includes the subject matter of Examples 15-17, wherein the one or more policy/parameter thresholds are based on one or more features including one or more of governmental laws, administrative rules and regulations, organizational policies, cultural norms, societal customs, and ethical expectations, wherein the one or more policy/parameter thresholds are dynamically modified based on changes in the one or more features, wherein the one or more features are extracted from one or more of the training data, the field data, the metadata, and user inputs.

Example 19 includes the subject matter of Examples 15-18, wherein the one or more processors are further to: transmit one or more surveys to one or more computing devices over one or more communication mediums, wherein the one or more surveys are used to collect the user inputs from one or more users having access to the one or more computing devices, wherein the user inputs includes one or more of policy contexts, policy reasons, and policy recommendations; evaluate the one or more policy/parameter thresholds based on the user inputs; and modify the one or more policy/parameter thresholds based on the user inputs.

Example 20 includes the subject matter of Examples 15-19, wherein the one or more processors are further to adjust the detection of the one or more discrepancies based on the one or more modified policy/parameter thresholds.

Example 21 includes the subject matter of Examples 15-20, wherein the one or more processors include one or more of a graphics processor and an application processor, wherein the one or more processors are co-located on a common semiconductor package Some embodiments pertain to Example 22 that includes an apparatus facilitating misuse index for explainable artificial intelligence in computing environments, the apparatus comprising: means for mapping training data with inference uses in a machine learning environment, wherein the training data is used for training a machine learning model; means for detecting, based on one or more policy/parameter thresholds, one or more discrepancies between the training data and the inference uses; means for classifying the one or more discrepancies as one or more misuses; and means for creating a misuse index listing the one or more misuses.

Example 23 includes the subject matter of Example 22, wherein the inference uses are based on field data captured using one or more capturing devices including one or more of a camera, a microphone, and one or more sensors, wherein the training data and the field data are labeled with metadata to identify detailed contents relating to one or more of the training data and the field data, wherein the machine learning environment is part of an explainable artificial intelligence (XAI) environment.

Example 24 includes the subject matter of Examples 22-23, further comprising: means for determining the one or more misuses to be one or more errors or one or more policy/parameter-altering acts; means for modifying the misuse index to distinguish between the one or more errors and the one or more policy/parameter-altering acts; and means for proposing actionable tasks to respond to the one or more policy/parameter-altering acts, wherein the actionable tasks include one or more of modifying the one or more policy/parameter thresholds, pausing the one or more policy/parameter-altering acts, and issuing one or more warnings to prevent future occurrences of the one or more policy/parameter altering acts.

Example 25 includes the subject matter of Examples 22-24, wherein the one or more policy/parameter thresholds are based on one or more features including one or more of governmental laws, administrative rules and regulations, organizational policies, cultural norms, societal customs, and ethical expectations, wherein the one or more policy/parameter thresholds are dynamically modified based on changes in the one or more features, wherein the one or more features are extracted from one or more of the training data, the field data, the metadata, and user inputs.

Example 26 includes the subject matter of Examples 22-25, further comprising: means for transmitting one or more surveys to one or more computing devices over one or more communication mediums, wherein the one or more surveys are used to collect the user inputs from one or more users having access to the one or more computing devices, wherein the user inputs includes one or more of policy contexts, policy reasons, and policy recommendations; and means for evaluating the one or more policy/parameter thresholds based on the user inputs; means for modifying the one or more policy/parameter thresholds based on the user inputs.

Example 27 includes the subject matter of Examples 22-26, further comprising means for adjusting the detection of the one or more discrepancies based on the one or more modified policy/parameter thresholds.

Example 28 includes the subject matter of Examples 22-27, further comprising one or more processors including one or more of a graphics processor and an application processor, wherein the one or more processors are co-located on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method for machine learning, comprising:
   determining whether there is any misuse of a machine learning model associated with an inference of the machine learning model based on training data and inference data, wherein the machine learning model is trained with the training data, and the inference of the machine learning model is based on the inference data;
   after determining that there is a misuse, determining a misuse index value for the misuse based on the inference; and
   evaluating, based on the misuse index value, a severity of the misuse of the machine learning model.

2. The method of claim 1, wherein determining where there is any misuse of the machine learning model comprises:
   detecting one or more discrepancies between the training data and the inference data.

3. The method of claim 1, wherein determining whether there is any misuse of the machine learning model comprises:
   determining whether there is any misuse of the machine learning model further based on metadata associated with the training data.

4. The method of claim 1, wherein determining the misuse index value for the misuse comprises:
   performing a plurality of inferences of the machine learning model using the inference data, the plurality of inferences comprising the inference; and
   determining the misuse index value for the misuse based on the plurality of inferences, the misuse index value meeting a confidence level.

5. The method of claim 4, wherein each of the plurality of inferences comprises inputting the inference data into the machine learning model.

6. The method of claim 1, wherein evaluating the severity of the misuse of the machine learning model comprises:
   performing a comparison of the misuse index value with one or more threshold values; and
   evaluating the severity based on a result of the comparison.

7. The method of claim 1, further comprising:
   mitigating the misuse of the machine learning model by:
      forming new training data, wherein a feature is better represented by the new training data than the training data, and
      training the machine learning model with the new training data.

8. One or more non-transitory computer-readable media storing instructions executable to perform operations for machine learning, the operations comprising:
   determining whether there is any misuse of a machine learning model associated with an inference of the machine learning model based on training data and inference data, wherein the machine learning model is trained with the training data, and the inference of the machine learning model is based on the inference data;
   after determining that there is a misuse, determining a misuse index value for the misuse based on the inference; and
   evaluating, based on the misuse index value, a severity of the misuse of the machine learning model.

9. The one or more non-transitory computer-readable media of claim 8, wherein determining where there is any misuse of the machine learning model comprises:
   detecting one or more discrepancies between the training data and the inference data.

10. The one or more non-transitory computer-readable media of claim 8, wherein determining whether there is any misuse of the machine learning model comprises:
    determining whether there is any misuse of the machine learning model further based on metadata associated with the training data.

11. The one or more non-transitory computer-readable media of claim 8, wherein determining the misuse index value for the misuse comprises:
    performing a plurality of inferences of the machine learning model using the inference data, the plurality of inferences comprising the inference; and
    determining the misuse index value for the misuse based on the plurality of inferences, the misuse index value meeting a confidence level.

12. The one or more non-transitory computer-readable media of claim 11, wherein each of the plurality of inferences comprises inputting the inference data into the machine learning model.

13. The one or more non-transitory computer-readable media of claim 8, wherein evaluating the severity of the misuse of the machine learning model comprises:
    performing a comparison of the misuse index value with one or more threshold values; and
    evaluating the severity based on a result of the comparison.

14. The one or more non-transitory computer-readable media of claim 8, wherein the operations further comprise:
    mitigating the misuse of the machine learning model by:
       forming new training data, wherein a feature is better represented by the new training data than the training data, and
       training the machine learning model with the new training data.

15. An apparatus, comprising:
    a computer processor for executing computer program instructions; and
    a non-transitory computer-readable memory storing computer program instructions executable by the computer processor to perform operations comprising:

determining whether there is any misuse of a machine learning model associated with an inference of the machine learning model based on training data and inference data, wherein the machine learning model is trained with the training data, and the inference of the machine learning model is based on the inference data, after determining that there is a misuse, determining a misuse index value for the misuse based on the inference, and evaluating, based on the misuse index value, a severity of the misuse of the machine learning model.

16. The apparatus of claim 15, wherein determining where there is any misuse of the machine learning model comprises:

detecting one or more discrepancies between the training data and the inference data.

17. The apparatus of claim 15, wherein determining whether there is any misuse of the machine learning model comprises:

determining whether there is any misuse of the machine learning model further based on metadata associated with the training data.

18. The apparatus of claim 15, wherein determining the misuse index value for the misuse comprises:

performing a plurality of inferences of the machine learning model using the inference data, the plurality of inferences comprising the inference; and determining the misuse index value for the misuse based on the plurality of inferences, the misuse index value meeting a confidence level.

19. The apparatus of claim 15, wherein evaluating the severity of the misuse of the machine learning model comprises:

performing a comparison of the misuse index value with one or more threshold values; and evaluating the severity based on a result of the comparison.

20. The apparatus of claim 15, wherein the operations further comprise:

mitigating the misuse of the machine learning model by:
  forming new training data, wherein a feature is better represented by the new training data than the training data, and training the machine learning model with the new training data.

* * * * *